UNITED STATES PATENT OFFICE.

ALBERT H. BULLARD, OF NEW ROCHELLE, NEW YORK.

COFFEE PREPARATION.

1,026,971.     Specification of Letters Patent.     Patented May 21, 1912.

No Drawing.     Application filed December 24, 1910. Serial No. 599,110.

*To all whom it may concern:*

Be it known that I, ALBERT H. BULLARD, a citizen of the United States of America, residing in New Rochelle, in the county of Westchester and State of New York, have invented certain new and useful Improvements in Coffee Preparations, of which the following is a specification.

This invention relates to an improved coffee-preparation which is intended particularly for being dispensed at soda-water fountains, in hot or cold state, also as a base and flavor for egg drinks, and which is also conveniently adapted for outing, camping, mining and household purposes.

The main feature of the invention is to produce instantaneously without the usual facilities at hand a natural and acceptable cup of coffee without sediment, which is complete in itself with milk and sugar, without the addition of anything but hot water. It also has the advantage of not noticeably deteriorating while in its original state as is the case with liquid coffee preparations. The preparation has the natural tonic property of the coffee, and at the same time the nutritious property of milk and sugar.

For this purpose, the invention consists of a coffee-preparation which comprises a mixture of evaporated extract of coffee, finely powdered or pulverized, malted milk, dry milk, powdered sugar and salt in proportions to be more fully set forth hereinafter.

In making my improved coffee-preparation, the roasted coffee-beans are first subjected to the action of steam so as to extract the tonic and aromatic principles, the extract being then evaporated, preferably in the vacuum until dry, and the dry extract finely pulverized by grinding. This finely ground extract of coffee is mixed with malted milk, dry milk, powdered sugar and salt in the following proportions:

| | |
|---|---|
| Pulverized extract of coffee | 25 % |
| Malted milk | 12½% |
| Dry milk | 32 % |
| Powdered sugar | 30 % |
| Ordinary salt | ½% |

The parts are intimately mixed with each other by being passed through suitable rollers and then packed in glass vessels or tin cans. A heaping teaspoonful of the dry mixture is used per cup and prepared simply by the addition of hot or boiling water of the required quantity. As all the parts dissolve quickly in the boiling water and as all the ingredients of the mixture are perfectly soluble, a well tasting and attractive, finished or completed coffee beverage is obtained, which is especially adapted for use at soda-water fountains for either hot or cold drinks. The malted milk, dry milk and sugar supply nutritous ingredients, while the coffee constituents impart the natural aroma and tonic property of the coffee-bean to the beverage. A small quantity of salt is used for imparting a certain pungency to the taste of the beverage.

The advantage of my improved composition is to be able to instantly produce a coffee beverage from a dry preparation by the mere addition of hot water. This renders its use more varied and efficient than any preparation hitherto known.

The preparation produced differs from others in that it is dry and in that on the mere addition of hot water a beverage results having all the qualities of the best coffee but without any sediment whatever since all the constituent parts of the preparation are dissolved and add to the result produced and sought for.

Having thus described my invention, I claim as new and desire to secure by Letters Patent:

1. A dry coffee preparation comprising a dry mixture of a dry pulverized evaporated extract of coffee, dry powdered milk, dry malted milk, and dry powdered sugar, intimately mixed together.

2. A dry coffee preparation comprising a dry mixture, consisting of about 25% dry pulverized, evaporated extract of coffee, about 12½% of dry malted milk, about 32% of dry milk, about 30% dry powdered sugar and about ½% dry ordinary salt, all intimately mixed together.

In testimony, that I claim the foregoing as my invention, I have signed my name in presence of two subscribing witnesses.

ALBERT H. BULLARD.

Witnesses:
PAUL GOEPEL,
L. M. DORMAN.